(12) United States Patent
Xu et al.

(10) Patent No.: US 8,296,527 B2
(45) Date of Patent: Oct. 23, 2012

(54) METHOD AND SYSTEM FOR IMPLEMENTING MULTI-CONTROLLER SYSTEMS

(75) Inventors: Yan Hua Xu, Southfield, MI (US); Mark Reitzel, Southfield, MI (US); Jerry Simons, Southfield, MI (US); Terrance John Walsh, St Clair Shores, MI (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 369 days.

(21) Appl. No.: 12/622,142

(22) Filed: Nov. 19, 2009

(65) Prior Publication Data

US 2011/0119453 A1 May 19, 2011

(51) Int. Cl.
G06F 12/00 (2006.01)
(52) U.S. Cl. ........................................ 711/148; 714/4.2

(58) Field of Classification Search ................... 711/148; 714/4.2
See application file for complete search history.

(56) References Cited

U.S. PATENT DOCUMENTS

| 7,003,688 | B1 * | 2/2006 | Pittelkow et al. ............... 714/4.2 |
| 2003/0023810 | A1 * | 1/2003 | Gordon et al. ................ 711/114 |
| 2007/0294563 | A1 * | 12/2007 | Bose ................................ 714/5 |
| 2010/0082839 | A1 * | 4/2010 | Brunson et al. ............... 709/235 |

* cited by examiner

Primary Examiner — Hashem Farrokh
(74) Attorney, Agent, or Firm — GE Global Patent Operation; Catherine Toppin

(57) ABSTRACT

A method for implementing a high-availability system that includes a plurality of controllers that each includes a shared memory. The method includes storing in the shared memory, by each controller, status data related to each of a plurality of failure modes, and calculating, by each controller, an availability score based on the status data. The method also includes determining, by each controller, one of the plurality of controllers having a highest availability score, and identifying the one of the plurality of controllers having the highest availability score as a master controller.

17 Claims, 6 Drawing Sheets

METHOD AND SYSTEM FOR IMPLEMENTING MULTI-CONTROLLER SYSTEMS

BACKGROUND

The embodiments described herein relate generally to automation systems and, more particularly, to high-availability automation systems that include multiple controllers.

At least some known automation systems include multiple controllers that have a preselected priority. For example, at least some known automation systems have a preselected active controller and a preselected standby controller. In the event of a failover, the active controller hands off control of the system to the standby controller. However, such systems may not take into consideration current operating conditions and status of the standby controller at the time of handoff. For example, a failure of the active controller may be caused in part by, or may itself cause, a communication issue between the standby controller and the rest of the system components. In such a situation, failover from the active controller to the standby controller may be impaired or prevented.

Moreover, at least some known automation systems include a preselected active controller and a plurality of standby controllers. In the event of a failure of the active controller, the system evaluates the operating conditions and statuses of each standby controller using a series of logical operations. However, as the number of failure modes and/or standby controllers increases, the number of logical operations that must be assessed increases to where organization and programming of the system failover software is very difficult.

BRIEF DESCRIPTION

In one aspect, a method is provided for implementing a high-availability system that includes a plurality of controllers that each includes a shared memory. The method includes storing in the shared memory, by each controller, status data related to each of a plurality of failure modes, and calculating, by each controller, an availability score based on the status data. The method also includes determining, by each controller, one of the plurality of controllers having a highest availability score, and identifying the one of the plurality of controllers having the highest availability score as a master controller.

In another aspect, a high-availability automation system is provided. The system includes a plurality of input/output (I/O) modules and a plurality of controllers coupled to each of the I/O modules via at least one first network. Each controller includes a memory and at least one processor coupled to the memory. The memory includes a plurality of memory portions each associated with one of the controllers and each configured to store data related to each of a plurality of failure modes. The processor is configured to receive the data related to the plurality of failure modes, store the data into one of the memory portions, calculate an availability score, identify as a master controller one of the controllers having a highest availability score, and store an indicator into one of the memory portions associated with the master controller.

In another aspect, one or more computer-readable storage media having computer-executable components are provided for implementing a high-availability system that includes a plurality of controllers each having a shared memory. The computer-executable components include a storage component that causes at least one processor to store in the shared memory of each controller status data related to each of a plurality of failure modes. The computer-executable components also include an availability component that causes the at least one processor to calculate an availability score based on the status data and to determine an identity of one of the controllers having a highest availability score. The computer-executable components also include a master controller component that causes the at least one processor to identify the controller having the highest availability score as a master controller.

BRIEF DESCRIPTION OF THE DRAWINGS

The embodiments described herein may be better understood by referring to the following description in conjunction with the accompanying drawings.

DETAILED DESCRIPTION

In some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

Exemplary technical effects of the apparatus, methods, systems, and computer-readable media described herein include at least one of: (a) storing in a shared memory status data related to a plurality of failure modes for each of a plurality of controllers in a high-availability automation system; (b) calculating an availability score for each controller based on the status data and a priority of each failure mode; (c) determining which of the plurality of controllers has a highest availability score; and (d) identifying the controller having the highest availability score as a master controller.

Figure 1:
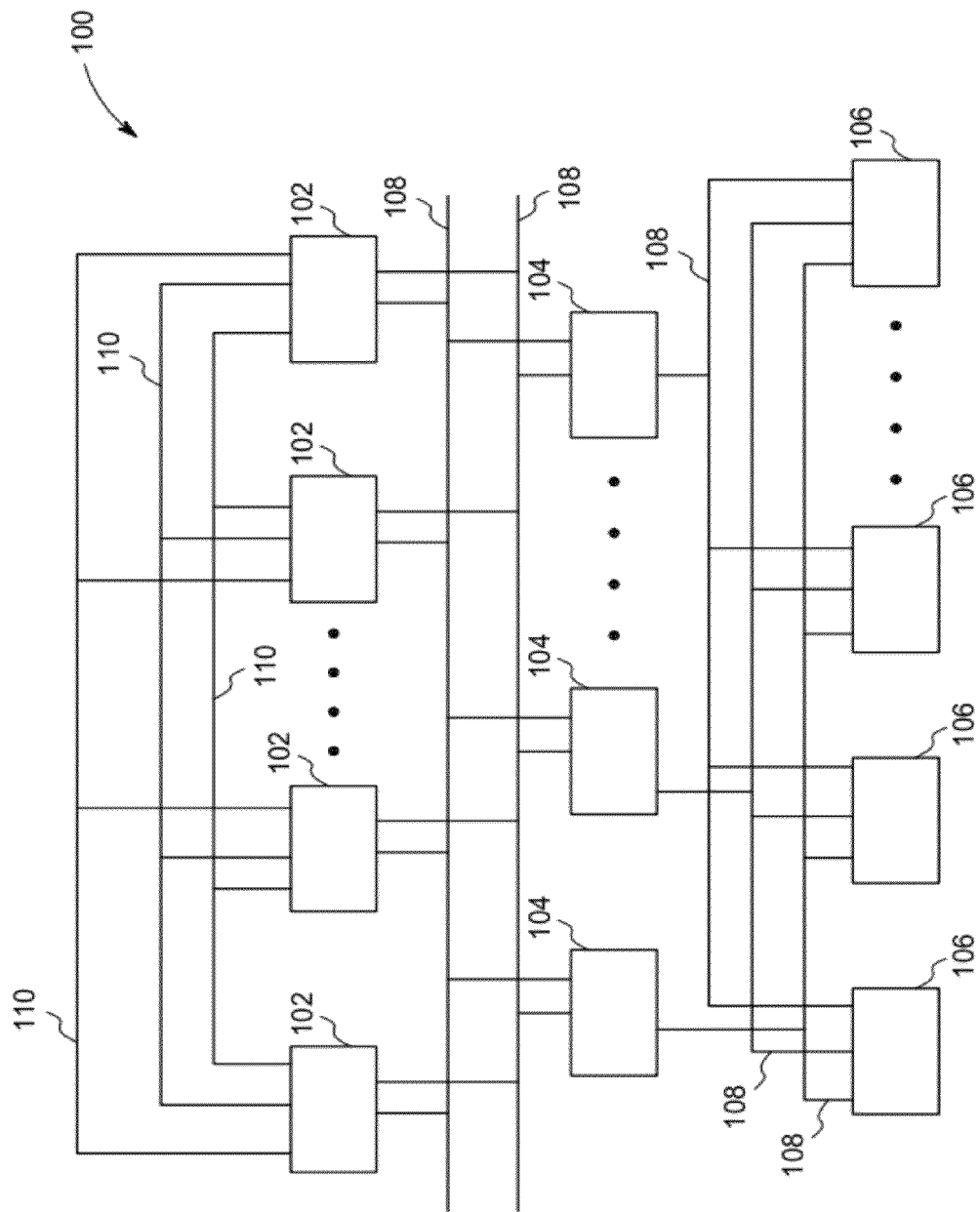
FIG. 1 is a schematic block diagram of an exemplary high-availability system.

FIG. 1 is a schematic block diagram of an exemplary high-availability system 100 that may be used in, for example, an automation system to facilitate providing functionality during and/or after failures within system 100. In the exemplary embodiment, system 100 includes a plurality of controllers 102, a plurality of interface units 104, and a plurality of input/output (I/O) modules 106. In some embodiments, controllers 102 are arranged in redundant pairs. Moreover, interface units 104 may operate alone or may operate in redundant pairs or triple arrangements. I/O modules 106 may be discrete modules, analog modules, or a mixture of discrete modules and analog modules.

Each interface unit 104 is coupled to each controller 102 via a first network 108. More specifically, system 100 includes a plurality of first networks 108 to provide redundant communication channels between interface units 104 and controllers 102. In the exemplary embodiment, first networks 108 are local area networks (LAN), such as a single LAN, a redundant LAN, or a triple LAN. However, any suitable network configuration may be used including, but not limited to only including, wide area networks (WAN), wireless local area networks (WLAN), or any other suitable network configuration. Moreover, first networks 108 may utilize any suitable communication protocol such as, but not limited to, Ethernet, IEEE 802.11, Serial Link, or the International Telecommunication Union Telecommunications Standardization Sector (ITU-T) G.hn protocol.

In addition, each controller 102 is coupled to each remaining controller 102 via a second network 110. In the exemplary embodiment, second network 110 is a fibre channel network. In alternative embodiments, second network 110 may be any suitable network type such as Ethernet or Serial Link. In the exemplary embodiment, system 100 includes a plurality of second networks 110 to provide redundant communication channels between controllers 102. More specifically, to facilitate fault tolerance, with N controllers 102, system 100 includes N−1 second networks 110. In addition, second networks 110 may be arranged in any suitable topology including, but not limited to, a star network, a ring network, or a point-to-point network. In the exemplary embodiment, each controller 102 shares data with each remaining controller 102 using a Main Data Sharing Connection (MDSC), which includes a Network Heartbeat function. Using the MDSCs, each controller 102 receives and stores, for all controllers 102, status data related to a plurality of failure modes in order to determine a master controller 112, as described in more detail below.

Furthermore, each interface unit 104 is coupled to each I/O module 106 via first network 108. In an alternative embodiment, each interface unit 104 is coupled to each I/O module 106 via a third network (not shown). More specifically, in such an embodiment, system 100 includes a plurality of third networks to provide redundant communication channels between interface units 104 and I/O modules 106.

Figure 2:
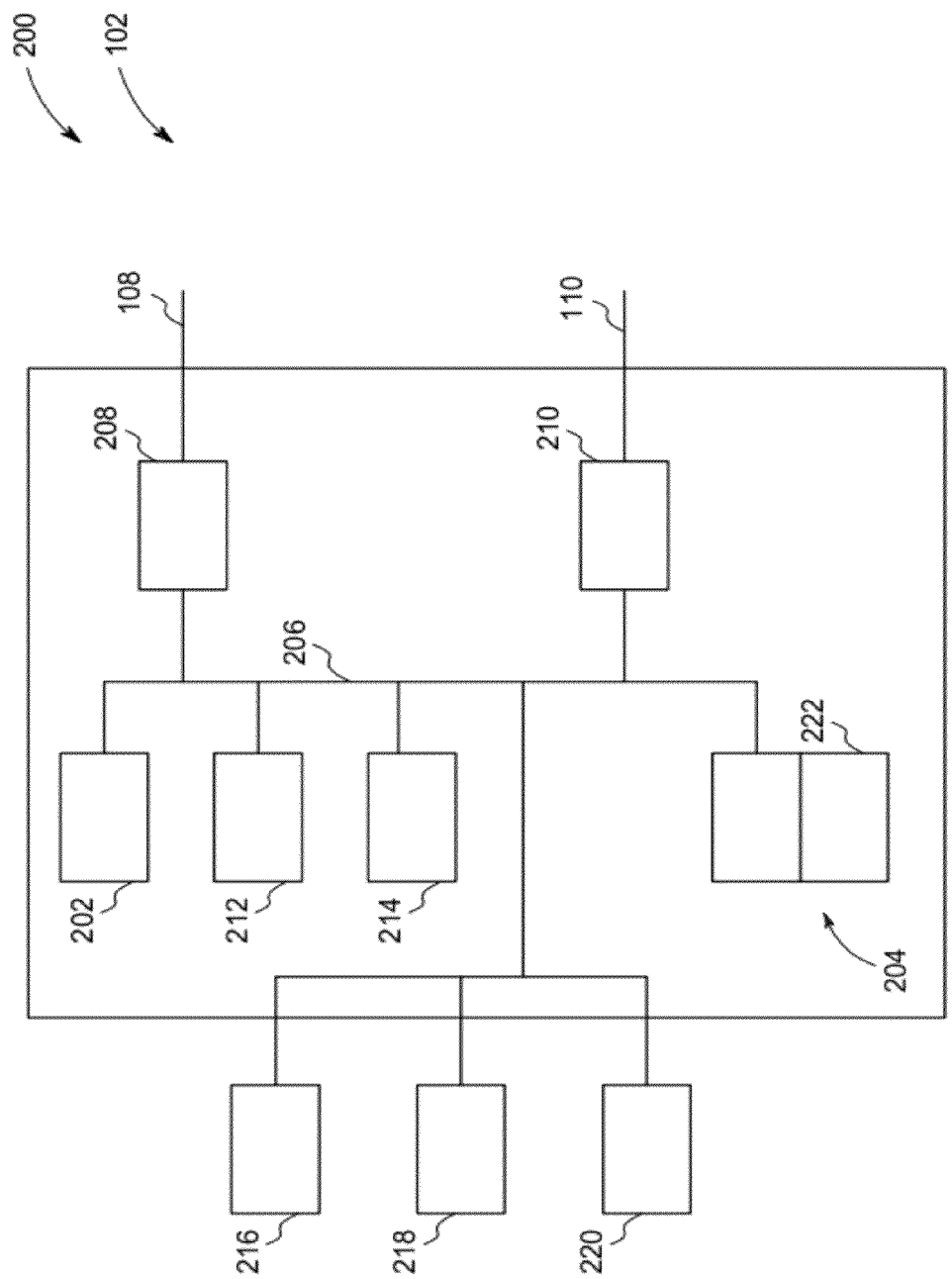
FIG. 2 is a schematic block diagram of an exemplary electrical architecture that may be used with a controller of the system shown in FIG. 1.

FIG. 2 is a schematic block diagram of an exemplary electrical architecture 200 incorporated into an exemplary controller, such as controller 102. In the exemplary embodiment, each controller 102 includes a processor 202 and a memory module 204 interconnected via a bus 206. Memory 204 may be a random access memory (RAM) module, a read only memory (ROM) module, or any other suitable memory module. In an alternative embodiment, each controller 102 includes multiple processors 202. Moreover, in an alternative embodiment, each controller 102 includes a plurality of memory modules 204 including one or more read-only memory (ROM) modules and/or one or more random-access memory (RAM) modules. In the exemplary embodiment, each controller 102 also includes a first network interface 208 that couples controller 102 to first network 108, and a second network interface 210 that couples controller 102 to second network 110. Specifically, each network interface 208 and 210 is coupled to processor 202 and memory 204 via bus 206. In an alternative embodiment, controller 102 includes a plurality of first network interfaces 208 and/or a plurality of second network interfaces 210 to facilitate communicating via multiple connections with first networks 108 and second networks 110, respectively. In another alternative embodiment, multiple first network interfaces 208 are coupled together to facilitate data transmission and reception responsibilities. Multiple second network interfaces 210 may be provided in a similar setup. In such an embodiment, first network interfaces 208 and/or second network interfaces 210 communicate with processor 202 and memory 204 via bus 206.

In some embodiments, each controller 102 also includes one or more computer hard drives 212 and a CD-ROM or DVD-ROM 214. Moreover, in some embodiments, each controller 102 includes one or more user interfaces coupled to processor 202 and memory 204 via bus 206, including a keyboard 216, a mouse 218, and/or a display device 220.

In the exemplary embodiment, a portion of memory 204 is shared memory 222. Shared memory 222 of each controller 102 is accessible to every other controller 102 in system 100, as described in more detail below. In an alternative embodiment, shared memory 222 is embodied as a separate memory module, such as a reflective memory module that is coupled to shared memory 222 of other controllers 102 via fiber optics.

Figure 3:
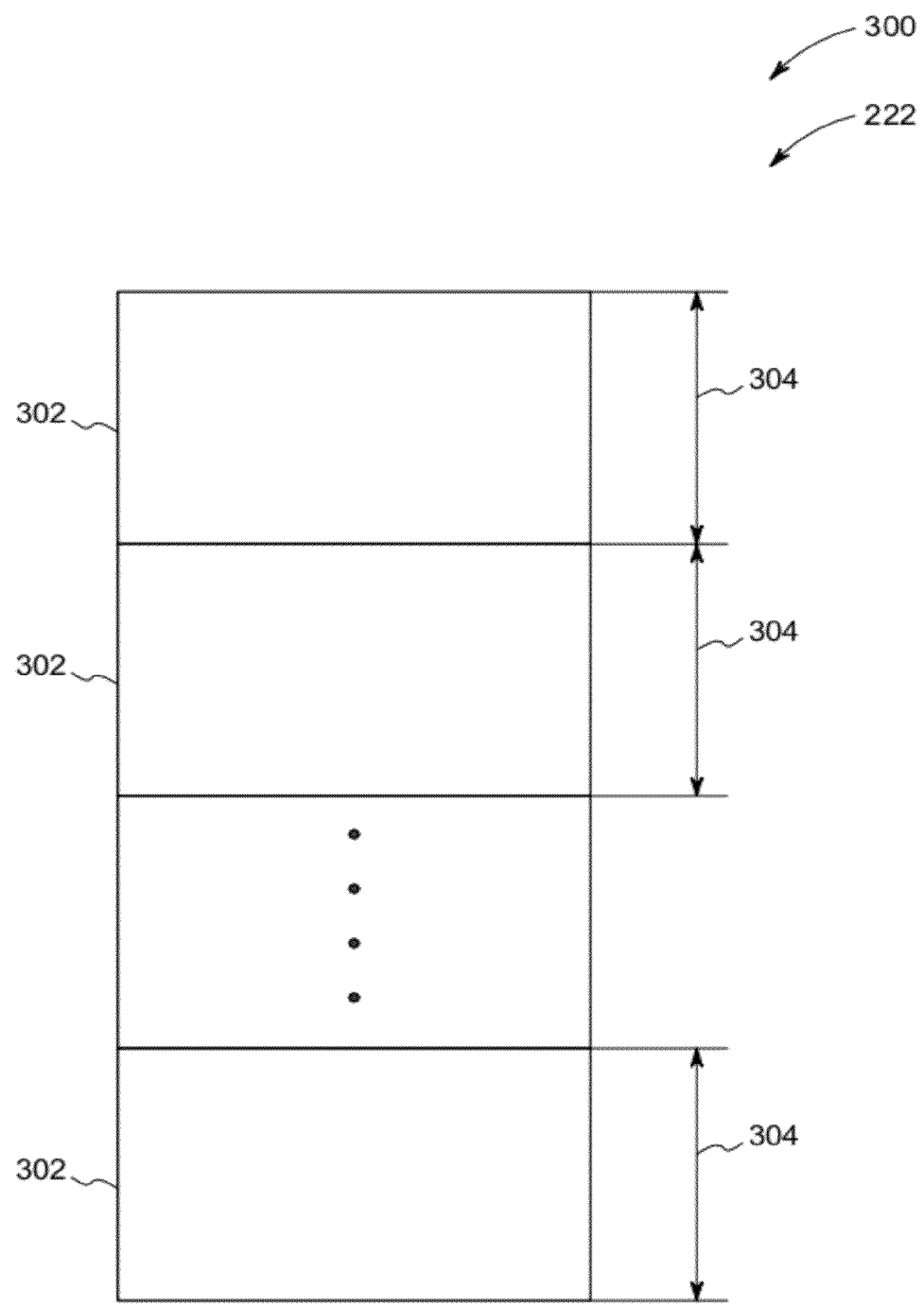
FIG. 3 is a schematic block diagram of an exemplary architecture of a shared memory within the controller shown in FIG. 1.

FIG. 3 is a schematic block diagram of an exemplary architecture 300 of shared memory 222 within each controller 102 (shown in FIGS. 1 and 2). In the exemplary embodiment, shared memory 222 includes a plurality of memory portions 302, wherein each memory portion 302 is associated with a particular controller 102 of system 100. More specifically, each controller 102 is identified with a unique identifier such as, but not limited to, a network node number, a network address, a machine access control (MAC) address, or any suitable and readable hardware tag. Shared memory 222 of each controller 102 stores status data relating to a plurality of failure modes of that controller 102 and is read-only for every other controller 102 in system 100. In the exemplary embodiment, each memory 204 has a specified interval 304. In the exemplary embodiment, interval 304 associated with each controller 102 is identically sized. In an alternative embodiment, interval 304 for one controller 102 has a different size than interval 304 for another controller 102.

Figure 4:
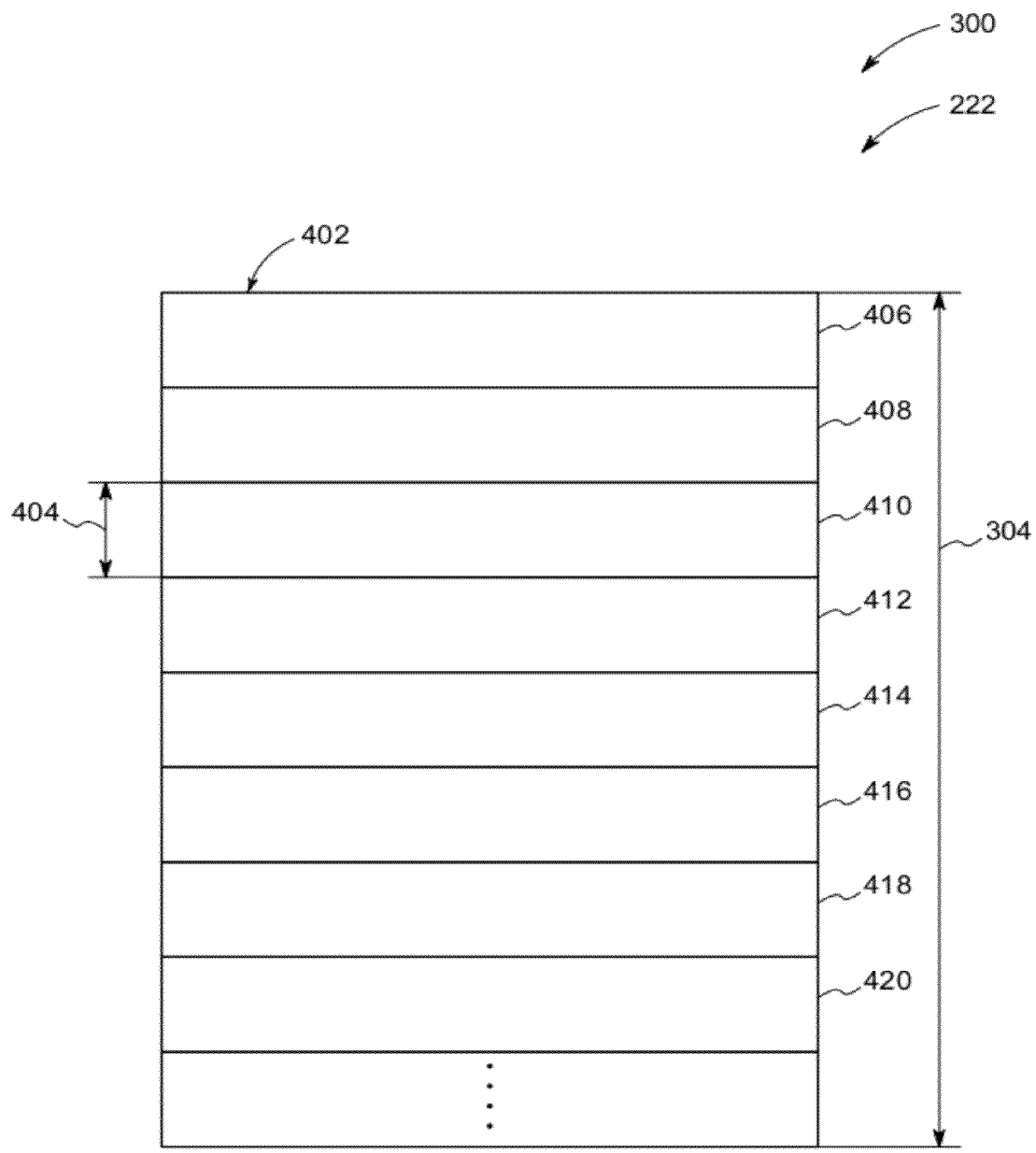
FIG. 4 is a schematic block diagram that further illustrates an architecture of the shared memory shown in FIG. 3.

FIG. 4 is a schematic block diagram that further illustrates architecture 300 of shared memory 222. Specifically, FIG. 4 illustrates memory interval 304 associated with one of controllers 102 (shown in FIGS. 1 and 2). Each memory interval 304 includes a starting memory address 402 for an associated controller 102. Moreover, each memory interval 304 includes a plurality of offsets 404 that are each associated with initial configuration values 406, Network Heartbeat function output 408, a first failure mode 410, a second failure mode 412, an $N^{th}$ failure mode 414, an availability score 416, an active announcement value (ANV) 418, a sequence number value 420, and any other necessary variables used within system 100.

Each failure mode is self-monitored by each controller 102, and current status data for each failure mode is stored in a respective offset 410, 412, and 414. Exemplary failure modes for a particular controller 102 include, but are not limited to, sharing of process data between controller 102 and master controller 112 (shown in FIG. 1), a number of controllers 102 with which the particular controller 102 is able to communicate, a number of MDSCs to which the particular controller 102 is coupled, whether the particular controller 102 has a functional redundant partner, a number of triple redundant interface units 104 (shown in FIG. 1) with which the particular controller 102 is able to communicate, a number of redundant interface units 104 with which the particular controller 102 is able to communicate, and/or a number of single interface units 104 with which the particular controller 102 is able to communicate. It should be understood that any suitable failure mode may be used, and that current status data of any suitable failure mode may be stored in a respective offset 410, 412, and 414 of interval 304 for a particular controller 102. The status data for each failure mode is an input for an availability calculation that is periodically performed by each controller 102 and readable by every controller 102 within system 100, and is stored in a particular offset 416 in an associated interval 304 in shared memory 422. The availability score calculation is used to determine a particular controller 102 having a highest availability score. Controller 102 having the highest availability score designates itself, via ANV 418, as master controller 112 for system 100.

Figure 5:
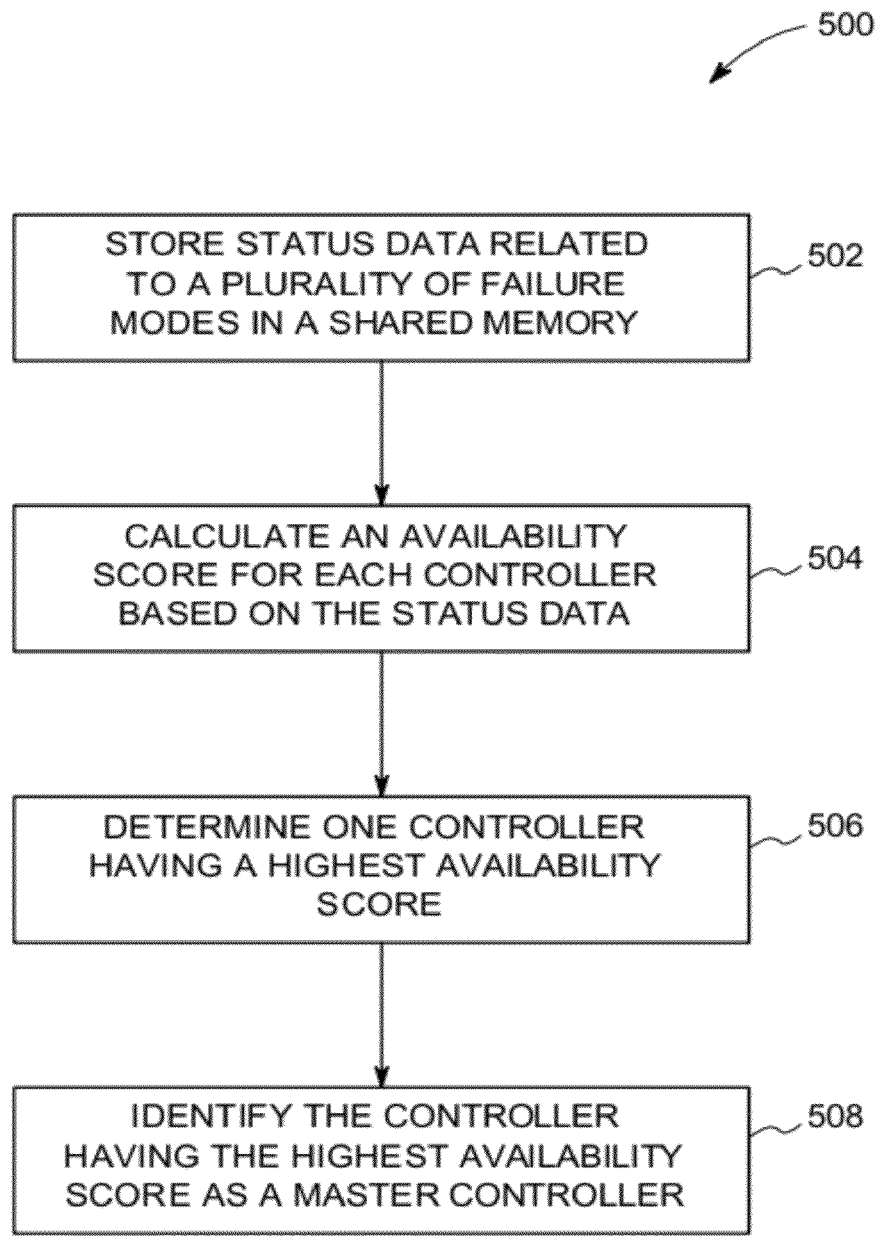
FIG. 5 is a high-level flowchart that illustrates an exemplary method for implementing the system shown in FIG. 1.

FIG. 5 is a high-level flowchart 500 that illustrates an exemplary method for implementing a high-availability system, such as system 100 (shown in FIG. 1). In the exemplary embodiment, each controller 102 (shown in FIGS. 1 and 2) stores 502 status data related to a plurality of failure modes in shared memory 222 (shown in FIG. 2). Specifically, each controller 102 stores the status data in shared memory portion 302 (shown in FIG. 3) associated with an identifier of that particular controller 102.

Based on the stored status data, each controller 102 calculates 504 its own availability score. Each controller 102 then scans the availability scores of the other controllers 102, and compares the availability scores to determine 506 which controller 102 has a highest availability score.

In the exemplary embodiment, controller 102 having the highest availability score identifies 508 itself as master controller 112 (shown in FIG. 1) by storing a master controller identifier in shared memory portion 302 associated with itself.

Figure 6:
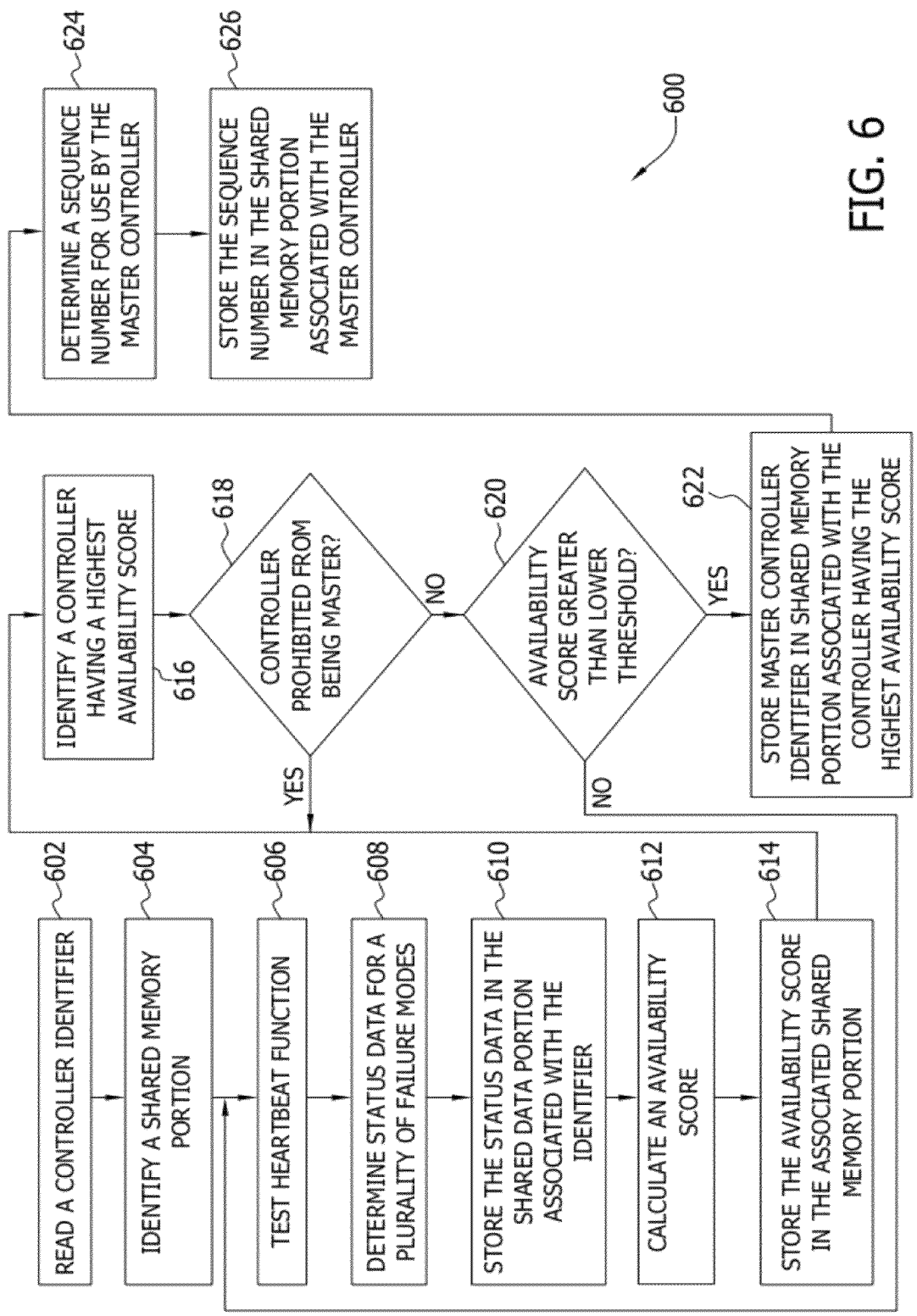
FIG. 6 is a detailed flowchart that further illustrates the method shown in FIG. 5.

FIG. 6 is a detailed flowchart 600 that further illustrates the method shown in FIG. 5. In the exemplary embodiment, during startup each controller 102 determines 602 an identifier, such as a MAC address. Each controller 102 then determines 604 shared memory portion 302 (shown in FIG. 3) for itself within shared memory 222 (shown in FIG. 2).

In the exemplary embodiment, each controller 102 (shown in FIGS. 1 and 2) then tests 606 the MDSC Network Heartbeat function to determine whether there are additional controllers 102 in system 100 (shown in FIG. 1). More specifically, each controller 102 tests communication links with all other controllers 102 in system 100. For example, each controller 102 may execute a network ping via second network interface 210 (shown in FIG. 2) and one or more second networks 110 (shown in FIG. 1) to all other controllers 102, and register each ping response as a successful test. In the exemplary embodiment, if there is no communication between controllers 102, then each controller 102 sets ANV offset 418 (shown in FIG. 4) to zero and disables all outputs to interface units 104 (shown in FIG. 1). Moreover, in the exemplary embodiment, if there is no communication between controllers 102, then each controller 102 periodically repeats the MDSC Network Heartbeat test.

After ensuring communication exists between controllers 102, each controller 102 determines 608 status data relating to each of a plurality of failure modes. As described above, exemplary failure modes include, but are not limited to, sharing of process data between controller 102 and master controller 112 (shown in FIG. 1), a number of controllers 102 with which the particular controller 102 is able to communicate, a number of MDSCs to which the particular controller 102 is coupled, whether the particular controller 102 has a functional redundant partner, a number of triple redundant interface units 104 with which the particular controller 102 is able to communicate via one or more first networks 108 (shown in FIG. 1), a number of redundant interface units 104 with which the particular controller 102 is able to communicate via one or more first networks 108, and/or a number of single interface units 104 with which the particular controller 102 is able to communicate via one or more first networks 108. Controller 102 stores 610 the status data in the identified shared memory portion 302. Specifically, processor 202 stores the status data in offset 404 (shown in FIG. 4) that is associated with each failure mode. For example, processor 202 stores status data related to a first failure mode into first failure mode offset 410, stores status data related to a second failure mode into second failure mode offset 412 (each shown in FIG. 4), and so on.

Based on the stored status data, each controller 102 calculates 612 an availability score for itself, and stores 614 the availability score in the identified shared memory portion 302 that is associated with that particular controller 102. Specifically, processor 202 calculates the availability score and stores the availability score in the appropriate shared memory portion 302. In the exemplary embodiment, each failure mode is prioritized based on any number of application requirements that may be specified and/or prioritized by a user via keyboard 216 and/or mouse (each shown in FIG. 2). Moreover, each controller 102 determines 616 whether it has the highest availability score. Specifically, processor 202 scans shared memory 222 of each controller 102 to determine an availability score for each controller 102. Processor 202 then compares each availability score to determine the highest score.

More specifically, each controller 102 uses a parallel availability calculation that weighs and summarizes an importance of each failure mode, and that compares only the final availability scores to determine which controller 102 is to be master controller 112. In some embodiments, each controller 102 calculates 612 its availability score using the following:

$$\alpha_0 = \text{Mod}(N \div 10) \quad \text{Eq. (1)}$$

$$\alpha_1 = \text{Mod}(I_1^{max} \div 10 + 1) + \alpha_0 \quad \text{Eq. (2)}$$

$$\alpha_{j+1} = \alpha_j + \text{Mod}(I_j^{max} \div 10 + 1) \quad \text{Eq. (3)}$$

$$\beta_0 = P_n \times 10^{\alpha_0} \quad \text{Eq. (4)}$$

$$\beta_j = 10^{\alpha_j} \quad \text{Eq. (5)}$$

$$TPV_n = \sum_{j=0}^{m} \beta_j \times I_j \quad \text{Eq. (6)}$$

where N is a number of controllers 102, $I_1^{max}$ is a maximum value for a first failure mode, $I_j^{max}$ is a maximum value for input j, $P_n$ is a predefined priority rank for a specific controller 102, and TPV is the availability score for a specific controller 102. As described above, each controller 102 calculates 612 its availability score and compares its own availability score to those of other controllers 102 in system 100.

In the exemplary embodiment, a user may designate whether one or more controllers 102 should not be designated as master controller 112 during, for example, manual operations and/or service operations. An input may be made using, for example, keyboard 216 and/or mouse 218, and stored in initial configuration value offset 406 (shown in FIG. 4). Accordingly, controller 102 that has been designated as master controller 112 determines 618 whether it has been prohibited from such designation. If master controller 112 is prohibited, each controller 102 determines 616 whether it has the next highest availability score. Moreover, in the exemplary embodiment, a user may specify a lower availability score threshold. Such input may be made using, for example, keyboard 216 and/or mouse 218, and similarly stored in initial configuration value offset 406. Controller 102 that has been designated as master controller 112 determines 620 whether its availability score is greater than the lower availability score threshold. If the master controller availability score is less than the lower availability score threshold, each controller 102 repeats each operation above.

If the master controller availability score is greater than the lower availability score threshold, a master controller identifier is stored 622 by controller 102 designated as master controller 112. Specifically, master controller 112 stores the master controller identifier in ANV offset 418 (shown in FIG. 4) to identify itself as master controller 112. Accordingly, in some embodiments, Equations (1)-(6) may be modified to incorporate additional such rules and/or configurations.

In the exemplary embodiment, master controller 112 then determines 624 a sequence number, and stores 626 the sequence number in sequence number offset 420 (shown in FIG. 4) of interval 304 associated with master controller 112. Specifically, processor 202 determines the sequence number using any suitable method for obtaining a unique code. For example, processor 202 may generate a hash value of the unique identifier associated with master controller 112. The sequence number is used by master controller 112 and interface units 104 (shown in FIG. 1) to differentiate commands transmitted by master controller 112 and other controllers 102 in system 100. In the exemplary embodiment, each controller 102 transmits commands and/or data to each interface unit 104, and each interface unit 104 stores the commands and/or data. However, each interface unit 104 only executes commands and/or manipulates data that includes the specified sequence number. Accordingly, in the exemplary embodiment, each interface unit 104 also generates the sequence number. In an alternative embodiment, master controller 112 transmits the sequence number to each interface unit 104, which stores the sequence number until a new sequence number is received after a change of master controller 112.

In some embodiments, the above operations of receiving status data, calculating availability scores, and determining a highest availability score are periodically repeated. The time period between scans is controlled by master controller 112. Moreover, in the exemplary embodiment, when a decrease in the availability score for master controller 112 is detected by controllers 102, the above-described process repeats to determine whether to failover to a new master controller 112 and, if so, which controller 102 should be designated as the new master controller 112.

Moreover, in some embodiments, a startup sequence of controllers 102 automatically determines master controller 112. For example, a user may configure startup parameters such that a first controller 102 to start designates itself as master controller 112. As additional controllers 102 start, each controller 102, including master controller 112, calculates 612 its availability score and a new master controller 112 may be designated via the operations described above. As another example, a user may configure startup parameters such that when multiple controllers 102 start at the same time or within a specified time period such that each controller 102 has the same availability score, a predefined order parameter is used to designate master controller 112. Similar to above, as additional controllers 102 start, each controller 102, including master controller 112, calculates 612 its availability score and a new master controller 112 may be designated via the operations described above.

Furthermore, to distinguish between controller 102 being first to start and controller 102 losing communication with other controllers 102 in system 100, in some embodiments, each controller 102 stores, such as temporarily stores, a summarization or manifest of availability scores for each controller 102 in system 100. When a controller 102 discovers that no other controllers 102 may be contacted, controller 102 compares its availability score to the stored availability scores. Controller 102 determines that it was not merely a first controller 102 to start when it detects that a higher availability score is stored in the summarization.

Exemplary embodiments of methods, systems, and computer-readable storage media for use in implementing a high-availability automation system are described above in detail. The methods, systems, and storage media are not limited to the specific embodiments described herein but, rather, operations of the methods and/or components of the system may be utilized independently and separately from other operations and/or components described herein. Further, the described operations and/or components may also be defined in, or used in combination with, other systems, methods, and/or storage media, and are not limited to practice with only the methods, systems, and storage media as described herein.

A controller, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary automation system environment, embodiments of the invention are operational with numerous other general purpose or special purpose automation system environments or configurations. The automation system environment is not intended to suggest any limitation as to the scope of use or functionality of any aspect of the invention. Moreover, the automation system environment should not be interpreted as having any dependency or requirement relating to any one or combination of components illustrated in the exemplary operating environment. Examples of well known automation systems, environments, and/or configurations that may be suitable for use with the embodiments described herein include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for implementing a high-availability system that includes a plurality of controllers that each includes a shared memory, said method comprising:
    storing in the shared memory, by each controller, status data related to each of a plurality of failure modes;
    calculating, by each controller, an availability score based on the status data associated, and a priority of each failure mode;
    determining, by each controller, one of the plurality of controllers having a highest availability score; and
    identifying the one of the plurality of controllers having the highest availability score as a master controller.

2. A method in accordance with claim 1, wherein storing status data comprises storing status data in a portion of the shared memory associated with each controller.

3. A method in accordance with claim 2, further comprising storing a plurality of parameters and a plurality of default values in a separate portion of the shared memory.

4. A method in accordance with claim 2, wherein determining one of the plurality of controllers having a highest availability score comprises scanning the portion of the shared memory associated with each of the plurality of controllers.

5. A method in accordance with claim 1, wherein identifying one of the plurality of controllers as a master controller comprises storing an indicator in a portion of the shared memory associated with the master controller.

6. A high-availability automation system comprising:
    a plurality of input/output (I/O) modules; and
    a plurality of controllers coupled to each of said plurality of I/O modules via at least one first network, each controller comprising:
        a memory comprising a plurality of memory portions each associated with one of said plurality of controllers, each memory portion configured to store data related to each of a plurality of failure modes; and
        at least one processor coupled to said memory, said processor configured to:
            receive the data related to the plurality of failure modes;
            store the data into one of said memory portions;
            calculate an availability score based on the data;
            periodically scan each controller to receive the availability score of each controller;
            identify as a master controller one of said plurality of controllers having a highest availability score; and
            store an indicator into one of said memory portions associated with the master controller.

7. A high-availability automation system in accordance with claim 6, wherein said at least one processor of the master controller is configured to synchronize each scan.

8. A high-availability automation system in accordance with claim 6, wherein said plurality of controllers are interconnected via at least one second network.

9. A high-availability automation system in accordance with claim 8, wherein at least a portion of the plurality of failure modes relate to communications between each controller via said at least one second network.

10. A high-availability automation system in accordance with claim 6, wherein at least a portion of the plurality of failure modes relate to communications between each controller and each I/O module.

11. A high-availability automation system in accordance with claim 6, wherein said plurality of controllers each includes a unique identifier.

12. A high-availability automation system in accordance with claim 11, wherein each of said plurality of memory portions is associated with a respective identifier of one of said plurality of controllers.

13. A high-availability automation system in accordance with claim 6, wherein said at least one processor of the master controller is configured to store a sequence number in one of said plurality of memory portions associated with the master controller.

14. A high-availability automation system in accordance with claim 13, wherein each controller is configured to communicate with each I/O module via said at least one first network, and wherein each I/O module is configured to execute only those communications that include the sequence number.

15. One or more computer-readable storage media having computer-executable components for implementing a high-availability system that includes a plurality of controllers that each includes a shared memory, said components comprising:
    a storage component that when executed by at least one processor causes the at least one processor to store in the shared memory of each controller status data related to each of a plurality of failure modes;
    an availability component that when executed by the at least one processor causes the at least one processor to:
        calculate an availability score for each controller, based on the status data, and a priority of each failure mode; and
        determine an identity of one of the controllers having a highest availability score; and a master controller component that when executed by the at least one processor causes the at least one processor to identify the controller having the highest availability score as a master controller.

16. One or more computer-readable storage media in accordance with claim 15, wherein the storage component stores status data in a portion of the shared memory associated with each controller.

17. One or more computer-readable storage media in accordance with claim 15, wherein the storage component stores a plurality of parameters and a plurality of default values in a separate portion of the shared memory.

* * * * *